United States Patent [19]

Ito et al.

[11] Patent Number: 4,755,560

[45] Date of Patent: Jul. 5, 1988

[54] PROCESS FOR PRODUCING HIGHLY WATER-ABSORBING POLYMER

[75] Inventors: Kiichi Ito; Takeshi Shibano, both of Yokkaichi, Japan

[73] Assignee: Mitsubishi Petrochemical Co., Ltd., Tokyo, Japan

[21] Appl. No.: 66,517

[22] Filed: Jun. 26, 1987

Related U.S. Application Data

[63] Continuation of Ser. No. 841,112, Mar. 18, 1986, abandoned.

[30] Foreign Application Priority Data

Mar. 18, 1985 [JP] Japan ................................. 60-52357
May 16, 1985 [JP] Japan ................................. 60-104715

[51] Int. Cl.$^4$ ................................................ G08F 8/00
[52] U.S. Cl. ..................................... 525/100; 525/280; 525/329.5; 525/329.6; 525/329.7; 525/342
[58] Field of Search ....................... 525/100, 288, 342

[56] References Cited

U.S. PATENT DOCUMENTS 4,062,817 12/1977 Waterman ...................... 525/329.6
4,173,669 11/1979 Ashida et al. .................... 525/329.5

*Primary Examiner*—Joseph L. Schofer
*Assistant Examiner*—Bernard Lipman
*Attorney, Agent, or Firm*—Wenderoth, Lind & Ponack

[57] ABSTRACT

A process for producing a highly water-absorbing polymer, which comprises treating a water-absorbing polymer containing a carboxyl group and/or a carboxylate group with a silane coupling agent in the presence of water.

7 Claims, No Drawings

PROCESS FOR PRODUCING HIGHLY WATER-ABSORBING POLYMER

This application is a continuation, of now abandoned application Ser. No. 841,112, filed Mar. 18, 1986.

This invention relates to a process for producing a highly water-absorbing polymer. More specifically, this invention relates to a process for producing a highly water-absorbing polymer having a high rate of water absorption and a high strength in the water-absorbed and swollen state (the polymer in this state will be referred to as an "water-absorbed gel").

The highly water-absorbing polymer produced by the process of this invention swells by absorbing a large quantity of water within a short period of time, but is insoluble in water. The polymer gel which has swollen as a result of water absorption has high strength. Hence, it can be used advantageously for the production of various water-absorbing materials or various materials for use in the water-absorbed and swollen state.

Paper, pulp, nonwoven fabrics, sponge-like urethane resins, etc. have been used as a water-holding agent in various sanitary materials such as sanitary napkins and paper diapers and various agricultural materials. Since, however, these materials absorb water in an amount of only 10 to 50 times their own weight, and large amounts of materials are required in order to absorb or hold a large amount of water. The materials thus become very bulky, and also have the defect that when pressed, the water they hold separates easily.

In an attempt to remedy the aforesaid defects of water-absorbing materials of this type, various highly water-absorbing polymeric materials have been proposed in recent years.

Japanese Patent Publication No. 46199/1978 describes that a resinous water-absorbing or water-holding material is produced by polymerizing (A) starch or cellulose, (B) a monomer having an addition-polymerizable double bond which is water-soluble or becomes water-soluble when hydrolyzed, and (c) a crosslinking agent, and if required, hydrolyzing the polymer.

Japanese Laid-Open Patent Publication No. 80376/1975 describes a process for producing a water-absorbing but water-insoluble cellulose ether, which comprises reacting cellulose with a crosslinking agent having an acrylamide, chloroazomethine or allyloxyazomethine group as a functional group for cellulose or a crosslinking agent having a dichloroacetic acid or phosphorus oxychloride in the presence of 0.8 to 7.5 parts by weight, per part by weight of cellulose, of isopropanol to etherify it to carboxymethyl cellulose, carboxymethylhydroxyethyl cellulose, hydroxyethyl cellulose or methylhydroxyethyl cellulose.

Japanese Patent Publication No. 23462/1968 discloses a process for producing a water-swellable crosslinked polymer which comprises polymerizing acrylamide in the presence of a crosslinking agent having two or more polymerizable ethylenic groups, and thereafter, hydrolyzing 20 to 40 mole % of the amide of the polymer in the presence of a substantially stoichiometrical proportion of an alkali metal hydroxide.

Japanese Patent Publication No. 30710/1979 describes a process for producing a powderizable self-crosslinked alkali metal acrylate polymer having a water absorbability of at least 400, which comprises dispersing and suspending an aqueous solution of an alkali metal acrylate in a concentration of at least 40% by weight containing a water-soluble radical polymerization initiator in a petroleum-derived aliphatic hydrocarbon solvent such as n-hexane or ligroin in the presence of a sorbitan fatty acid ester having an HLB of 3 to 6, and polymerizing the monomer in the absence of a crosslinking agent.

The water-absorbing polymeric materials produced by such known processes, however, have one or more defects. For example, they have insufficient water-absorbability, or those having high water absorbability have slow rates of water absorption. Alternatively, because of the occurrence of "gel-blocking" (nonuniform water swelling and water absorption) when such a polymeric material is mixed with water, the material cannot permit efficient water absorption, and long periods of time are required for water absorption. For this reason, these conventional water-absorbing polymers are unsuitable for applications where a large quantity of water is absorbed and the ability to absorb water instantaneously is required, for example as sanitary napkins or paper diapers.

It is known that to increase the water dispersibility or solubility or the rate of water absorption of hydrophilic polymers, a surface-active agent such as sorbitan monostearate, a nonvolatile hydrocarbon, or calcium stearate powder is added to the hydrophilic polymers to render the surface of the polymers hydrophobic (see, for example, Japanese Laid-Open Patent Publication No. 44627/1982). However, when this method is applied to highly water-absorbing polymers, their water dispersibility in the very early stage cannot be improved, but the effect of increasing the rate of water absorption cannot be expected and rather, nonuniform water swelling and absorption occurs.

It is also known to increase the rate of absorption of a highly water-absorbing polymer by increasing the crosslinking density of the polymer and thus reducing the hydrophilicity of the polymer [see, for example, S. Aoki and H. Yamazaki, "Kagaku Zokan", 81, 93 (1979), and Japanese Laid-Open Patent Publication No. 44627/1982). This method can somewhat increase the rate of water absorption. But its increasing effect is not remarkable, and the method results in a marked reduction in water absorbability.

It is an object of this invention to provide a process for producing a highly water-absorbing polymer.

Another object of this invention is to provide a process for producing a highly water-absorbing polymer having a high rate of absorption and high water absorbability.

Still another object of this invention is to provide a process for producing a highly water-absorbing polymer which has a high rate of absorption and does not permit gel blocking (nonuniform water swelling and absorption).

Yet another object of this invention is to provide a process for producing a highly water-absorbing polymer whose strength in the water-absorbed and swollen state (the strength of a water-absorbed gel) is high.

Other objects of this invention along with its advantages will become apparent from the following description.

According to this invention, such objects and advantages of this invention are achieved by a process for producing a highly water-absorbing polymer, which comprises treating a water-absorbing polymer containing a carboxyl group and/or a carboxylate group with a silane coupling agent in the presence of water.

The water-absorbing polymer used as a starting material in the process of this invention should contain a carboxyl group and/or a carboxylate group. Examples of the starting polymer include crosslinked products of acrylic acid (salt) polymers, methacrylic acid (salt) polymers, acrylic acid (salt)/methacrylic acid (salt) copolymers, starch/acrylic acid (salt) graft copolymer, saponification products of starch/acrylic ester graft copolymers, a saponification product of a starch/methyl methacrylate graft copolymer, a saponification product of a methyl methacrylate/vinyl acetate copolymer, a saponification product of methyl acrylate/vinyl acetate copolymer, a saponification product of starch/acrylonitrile graft copolymer, a saponification product of starch/acrylamide graft copolymer, a saponification product of starch/acrylonitrile-2-acrylamide-2-methylpropanesulfonic acid graft copolymer, and a saponification product of starch/acrylonitrile/vinylsulfonic acid graft copolymer; polyethylene oxide crosslinked with acrylic acid; and crosslinked sodium carboxymethyl cellulose.

It should be understood that the above water-absorbing polymers include copolymers obtained by copolymerizing comonomers such as maleic acid or its salts, itaconic acid or its salts, acrylamide, 2-acrylamide-2-methylpropanesulfonic acid, 2-acryloylethanesulfonic acid, 2-methacryloylethanesulfonic acid, 2-hydroxyethyl acrylate or 2-hydroxyethyl methacrylate in amounts which do not reduce the performance of the water-absorbing polymers.

Preferably, the water-absorbing polymer is one containing at least one type of polymer units selected from the group consisting of units derived from acrylic acid, units derived from methacrylic acid, and units derived from acrylic or methacrylic acid in which the carboxyl group is in the form of a salt with an alkali metal.

The water-absorbing polymer is preferably used as a crosslinked product in the process of this invention. Means for crosslinking are known per se. For example, crosslinking may be effected physically by the entangling of molecular chains by the polymerization of the polymer molecules to a high degree; or by utilizing self-crosslinking induced by pseudo-crosslinking. Alternatively, the polymer may be crosslinked chemically by using divinyl compounds, such as N,N'-methylenebis(meth)acrylamide or (poly)ethylene glycol di(meth)acrylates, which are copolymerizable with various monomers.

Chemical crosslinking may also be carried out by adding a polyfunctional compound capable of reacting with a functional group such as a carboxylate group in the polymer, for example (poly)glycidyl ethers, haloepoxy compounds, polyaldehydes, polyols and polyamines, to the polymer and reacting part of the carboxylate group with the polyfunctional compound; or by performing reaction between functional groups in the polymer, for example, esterification between the carboxyl group and the hydroxyl group.

Examples of the carboxylate salt-type water-absorbing polymer are those of the alkali metal (Na or K) salt type, alkaline earth metal (Mg or Ca) salt type, ammonium salt type or amine salt type. The alkali metal salt-type water-absorbing polymers are especially preferred.

According to the process of this invention, the water-absorbing polymer is treated with a silane coupling agent in the presence of water.

Preferred silane coupling agents are those of the following formula (I)

$$X(R)_m Si(Y)_{3-m} \quad (I)$$

wherein X represents a group having a functional group capable of reacting with the carboxyl group and/or the carboxylate group of the water-absorbing polymer, R represents a hydrocarbon group, Y represents a hydrolyzable group, and m is 0, 1 or 2.

In formula (I), X is a group having a functional group capable of reacting with the carboxyl group and/or the carboxylate group of the water-absorbing polymer. Examples include an epoxy group, an amino group, a mercapto group, a chlorine atom and a cation of a quaternary amine.

Y is a hydrolyzable group such as a lower alkoxy group or a lower acyloxy group. Preferably, these groups have 1 to 4 carbon atoms. It is believed that the hydrolyzable group undergoes hydrolysis to form a silanol group which is dehydrocondensed in a well known manner to form an Si—O—Si bond.

R is a hydrocarbon group, for example, an alkyl or aryl group, preferably an alkyl group having 1 to 4 carbon atom or a phenyl group.

m is 0, 1 or 2. In other words, the silane coupling agent of formula (I) should have the hydrolyzable group (Y) as an essential group, but does not always have to contain the hydrocarbon group (R).

Examples of the silane coupling agents of formula (I) are gamma-glycidoxypropyltrimethoxysilane, gamma-glycidoxypropylmethyldiethoxysilane, beta-(3,4-eploxycyclohexyl)ethyltrimethoxysilane, gamma-(2-aminoethyl)aminopropyltrimethoxysilane, gamma-(2-aminoethyl)aminopropylmethyldimethoxysilane, gamma-aminopropyltriethoxysilane, N-phenylgamma-aminopropyltrimethoxysilane, gamma-mercaptopropyltrimethoxysilane, gamma-mercaptopropylmethyldimethoxysilane, gamma-chloropropyltrimethoxysilane, gamma-chloropropylmethyldimethoxysilane, and octadecyldimethyl[3-(trimethoxysilyl)propyl]ammonium chloride. Of these, silane coupling agents having a glycidyl group as the functional group X, such as gamma-glycidoxypropyltrimethoxysilane, are preferred.

Treatment with the silane coupling agents can be carried out in the presence of water in various manners.

If the treatment is carried out in the absence of water, the desired results cannot be obtained.

Specific manners of treatment with the silane coupling agent include, for example, a method which comprises adding a mixture of water and the silane coupling agent to the water-absorbing polymer in the dried state, and heating the resulting mixture to evaporate water; a method which comprises adding the water-absorbing polymer powder in an inert solvent to form a slurry, adding a mixture of the silane coupling and water to the slurry, and heating the mixture under reflux; and a method which comprises adding a mixture of the silane coupling agent and water to the aforesaid slurry, and evaporating the inert solvent and water. Another method comprises adding the silane coupling agent directly to the reaction product mixture containing the water-absorbing polymer and water obtained by the production of the water-absorbing polymer, and heating the mixture under reflux; or heating such a reaction product mixture containing the silane coupling agent to evaporate water.

In the treatment, dibutyltin dilaurate, dibutyltin diacetate, dibutyltin dioctoate, etc. known as a silanol condensation catalyst may be added, and by so doing, a highly water-absorbing polymer having a high rate of water absorption can be obtained more effectively.

The treatment can be carried out in the presence or absence of an inert organic solvent. Examples of such inert solvents are alcohols such as methanol and ethanol, ketones such as acetone and methyl ethyl ketone, ethers such as diethyl ether, dibutyl ether, dioxane and tetrahydrofuran, hydrocarbons such as n-pentane, n-hexane, n-heptane, cyclohexane, benzene, toluene and xylene, and halogenated hydrocarbons such as carbon tetrachloride, methylene chloride, chloroform and ethylene dichloride. Of these, hydrocarbons, particularly aliphatic or alicyclic hydrocarbons, such as n-hexane, n-heptane and cyclohexane are preferred.

The amount of the silane coupling agent used in the above treatment varies somewhat depending upon the type of the water-absorbing polymer, the amount of water present, the type and amount of the inert solvent, etc. Usually, it is 0.001 to 10.0% by weight, preferably 0.01 to 3% by weight, based on the weight of the water-absorbing polymer. If it is to small, it is difficult to obtain an effect of increasing the rate of water absorption and the gel strength. If it it too large, the water absorbability of the treated polymer tends to decrease.

The amount of water to be present in the above treatment is preferably 0.5 to 300% by weight, more preferably 5 to 100% by weight, based on the weight of the water absorbing polymer. If the amount of water is too small, the highly water-absorbing polymer does not easily become swollen during the treatment, and its reaction with the silane coupling agent does not effectively proceed. Consequently, a long period of time is required for the treatment and this is not advantageous to industrial practice. If the amount of water is too large, the gel strength of the resulting polymer increases, but the effect of increasing the rate of water absorption by the silane coupling agent is reduced Accordingly, a large amount of the silane copling agent is required, and the water absorbability of the resulting polymer is reduced.

The amount of the inert solvent used in the above treatment differs depending upon the type of the water-absorbing polymer and the type of the inert solvent. It is usually 10 to 5000% by weight, preferably 50 to 500% by weight, based on the weight of the water-absorbing polymer. If the amount of the inert solvent used is small, the amount of substances to be handled in the treatment is small and the volume efficiency of the treating apparatus increases. But since the dispersibility of the water-absorbing polymer during the treatment is reduced, the treating reaction does not effectively proceed. If the amount of the inert solvent is too large, the treating reaction easily proceeds. But on the other hand, the amount of substances to be handled increases, the volume efficiency of the apparatus is reduced, and the cost of the treatment increases. These are industrially disadvantageous.

The amount of the silanol condensation catalyst which may be used together with the silane coupling agent is usually 0.1 to 1000% by weight, preferably 1 to 500% by weight, based on the weight of the silane coupling agent.

The temperature at which the treatment with the silane coupling agent is carried out in the presence of water varies depending upon the type of the silane coupling agent, the type and amount of the inert solvent, the amount of water present, the type of the highly water-absorbing polymer, and cannot be generalized. Usually, it is within the range of 20° to 180° C., preferably 50° to 150° C.

Investigations of the present inventors have shown that in the most preferred embodiment of this invention, the above treatment is carried out in the presence of the silanol condensation catalyst and 10 to 50% by weight, based on the water-absorbing polymer, of water. In this embodiment, the water-absorbing polymer assumes a good swollen state during the treatment and reacts smoothly with the silane coupling agent to give a highly water-absorbable polymer which is very homogeneous and does not exhibit the "gel blocking" phenomenon.

The following Polymer Production Examples and Examples further illustrate the present invention in detail.

POLYMER PRODUCTION EXAMPLE 1

A water-absorbing polymer was produced by the following procedure in accordance with Example 1 described in Japanese Patent Application No. 236,685/1984.

Cyclohexane (375 g) was put in a 1-liter four-necked round-bottomed flask equipped with a stirrer, a reflux condenser, a thermometer and a nitrogen gas introduction tube, and 4.5 g of sorbitan monostearate was added and dissolved. Nitrogen gas was blown into the flask to drive off the dissolved oxygen.

Separately, 75 g of acrylic acid was put in a 500 ml flask, and with external ice cooling, a solution of 31.2 g of sodium hydroxide in 201 g of water was added to neutralize 74.9% of the carboxyl group of acrylic acid. The concentration of the monomer in water corresponded to 30% by weight. Thereafter, 0.25 g of potassium persulfate was added and dissolved, and nitrogen gas was blown into the flask to drive off the dissolved oxygen.

The contents of the 500 ml flask were added to the contents of the four-necked flask. The mixture was stirred to disperse it, and while nitrogen gas was bubbled through the flask, the inside temperature of the flask was elevated by an oil bath. After reaching 60° C., the inside temperature abruptly rose and reached 75° C. in serveral tens of minutes. Then, while the inside temperature was maintained at 60° to 65° C., the mixture was reacted for 4 hours with stirring at 250 rpm.

After the 4-hour reaction, the stirring was stopped, whereupon the wet polymer particles settled to the bottom of the flask. The polymer particles could be easily separated from the cyclohexane layer by decantation. The separated wet polymer was transferred to a vacuum dryer, and heated to 80° to 90° C. to remove the adhering cyclohexane and water. A nonsticky powdery polymer containing easily pulverizable masses was obtained.

POLYMER PRODUCTION EXAMPLE 2

A water-absorbing polymer was produced by the following procedure in acxordance with Example 1 of Japanese Patent Publication No. 30710/1979.

228 ml of n-hexane was put in a 500 ml four-necked round-bottomed flask equipped with a stirrer, a reflux condenser, a dropping funnel and a nitrogen gas introduction tube. Sorbitan monostearatae (1.8 g) was added and dissolved, and nitrogen gas was blown into the flask to drive off the dissolved oxygen.

Separately, 30 g of acrylic acid was put in an Erlenmeyer flask, and with external ice cooling, a solution of 13.1 g of sodium hydroxide having a purity of 95% in 39 g of water was added to neutralize 75% of the carboxyl group of acrylic acid. The monomer concentration in the aqueous phase was 45% by weight. Then, 0.1 g of potassium persulfatae was added and dissolved, and nitrogen gas was blown into the flask to drive off the dissolved oxygen.

The contents of the Erlenmeyer flask were added to the contents of the four-necked flask, and the mixture was dispersed. While nitrogen gas was introduced into the flask little by little and the inside temperature of the flask was maintained at 60° to 65° C. by an oil bath, the reaction was carried out for 6 hours. When the stirring of the reaction mixture was stopped after the reaction, the swollen polymer particles easily sedimented to form a suspension. The n-hexane was evaporated under reduced pressure, and the swollen polymer left was dried at 80° to 90° C. under reduced pressure. The resulting polymer was obtained as a non-sticky powder containing easily powderizable masses.

POLYMER PRODUCTION EXAMPLE 3

A water-absorbing polymer was produced by the following procedure in accordance with Example 1 of Japanese Laid-Open Patent Publication No. 131608/1981.

Acrylic acid (30 g) was put in a 100 ml flask, and with cooling and stirring, 58.7 g of a 22.6% aqueous solution of sodium hydroxide was added dropwise to neutralize 80% of the carboxyl group of acrylic acid. Then, 0.1 g of potassium persulfate was added, and the mixture was stirred to dissolve it at room temperature.

Separately, 163.4 g of cyclohexane and 1.9 g of sorbitan monolaurate having an HLB of 8.69 were introduced into a 500 ml flask equipped with a reflux condenser and purged with nitrogen gas, and stirred at room temperature to dissolve the surfactant. Thereafter, the above solution containing the partially neutralized acrylic acid was added dropwise to form a suspension. The reaction system was again fully purged with nitrogen gas, and the mixture was reacted for 3 hours while maintaining the oil bath temperature at 55° to 60° C. A dry polymer as fine granules was obtained by evaporating the resulting polymer solution to dryness under reduced pressure.

POLYMER PRODUCTION EXAMPLE 4

A water-absorbing polymer was produced by the following procedure in accordance with Example 9 of Japanese Laid-Open Patent Publication No. 25886/1977.

Corn starch powder (15 g) and 115 g of water were introduced into a reactor equipped with a stirrer, a nitrogen blowing tube and a thermometer, and in a nitrogen stream, the mixture was stirred at 80° C. for 1 hour. The resulting starch solution was cooled to 30° C., and 15 g of acrylic acid, 15 g of acrylamide, 0.15 g of calcium oxide and 0.15 g of ammonium persulfate and 0.015 g of sodium bisulfite as a catalyst were added. The mixture was stirred at 40° C. for 3 hours to polymerize the monomers. The reaction solution became an elastic white solid.

The white solid was dried under reduced pressure at 80° to 90° C. and pulverized to a powder. To the powder was added 146.5 g of a solution of 5% of sodium hydroxide in a 1:5 water-methanol mixture, and the mixture was left to stand at room temperature for 1 hour, dried under reduced pressure at 80° to 90° C., and pulverized to form a powdery polymer which was slightly brown.

POLYMER PRODUCTION EXAMPLE 5

A water-absorbing polymer was produced by the following procedure in accordance with Example 3 of Japanese Laid-Open Patent Publication No. 27455/1977.

Benzoyl peroxide (0.5 g) as a polymerization initiator was added to 60 g of vinyl acetate and 40 g of methyl acrylate. The mixture was dispersed in 300 ml of water containing 3 g of partially saponified polyvinyl alcohol as a dispersion stabilizer, and the monomers were polymerized at 65° C. for 6 hours. The resulting polymer was collected by filtration, and dried.

Thereafter, 25 g of the polymer was dissolved in 800 ml of methanol under heat, and 58.1 ml of a 40% aqueous solution of sodium hydroxide was added. The polymer was saponified at 60° C. for 5 hours. After the reaction, the saponified polymer was washed with methanol, and dried under reduced pressure to give a powdery polymer.

POLYMER PRODUCTION EXAMPLE 6

A water-absorbing polymer was produced by the following procedure in accordance with Example 11 of Japanese Laid-Open Patent Publication No. 71907/1983.

Acrylic acid (30 g) was added to 9.24 g of deionized water, and as a neutralizing agent, 20.6 g of potassium hydroxide having a purity of 85% and 0.00832 g of N,N'-methylenebisacrylamide were successively added to prepare an aqueous solution of potassium acrylate in a mixed monomer concentration of 70% by weight (neutralization degree 75%).

The aqueous solution was kept at 70° C., and a solution of 0.208 g of 2,2'-azobis(2-amidinopropane) dihydrochloride in 1.0 g of water was added. Immediately then, the mixture was allowed to flow down over the bottom surface of a cylindrical reactor having an inside diameter of about 10 cm (kept at 70° C. in advance). Polymerization began in several seconds, and the reaction was completed within about 1 minute. A dry polymer foamed by the heat of polymerization was obtained. The polymer was pulverized to a powder.

EXAMPLE 1

Twenty grams of a dry polymer produced as in Production Example 1 was put in a 300 ml eggplant-shaped flask, and then 25 g of cyclohexane was added to form a slurry. While the slurry was stirred, a solution of 0.0262 g of gamma-glycidoxypropyltrimethoxysilane and 0.0048 g of di-n-butyltin dilaurate in 4.5 g of water was added. The mixture was stirred at room temperature for about 30 minutes. Thereafter, the flask was immersed in an oil bath at 80° C. and the temperature was raised to 106° C. The mixture was then evaporated to dryness under reduced pressure while maintaining the same oil bath temperature. A dry polymer was obtained.

EXAMPLE 2

A dry polymer was obtained in the same way as in Example 1 except that a dry polymer obtained as in Production Example 2 was used as the starting polymer.

EXAMPLE 3

A dry polymer was obtained in the same way as in Example 1 except that a dry polymer obtained as in Production Example 3 was used as the starting polymer.

EXAMPLES 4–6

A dry polymer was obtained in the same way as in Example 1 except that a dry polymer obtained as in Production Example 4 (Example 4), 5 (Example 5), or 6 (Example 6) was used as the starting polymer.

EXAMPLE 7

A dry polymer was obtained in the same way as in Example 1 except that a dry polymer obtained as in Production Example 1 was used as the starting polymer, the amount of the gamma-glycidoxypropyltrimethoxysilane was changed to 0.0524 g, and di-n-butyltin dilaurate was not added.

EXAMPLE 8

A dry polymer was obtained in the same way as in Example 7 except that a dry polymer obtained as in Production Example 2 was used as the starting polymer.

EXAMPLE 9

Water (180 g) was distilled out from the same polymerization reaction mixture as obtained in Production Example 1. To the residue were added 0.205 g of gammaglycidoxypropyltrimethoxysilane and 0.021 g of di-n-butyltin dilaurate. After thorough mixing, the mixture was immersed in an oil bath at 80° C. The oil bath temperature was elevated to 106° C. The mixture was then evaporated to dryness under reduced pressure while this oil bath temperature was maintained. A dry polymer was obtained.

EXAMPLE 10

Water (30 g) was distilled out from the same polymerization reaction mixture as obtained in Production Example 2. To the residue were added 0.075 g of gamma-glycidoxypropyltrimethoxysilane and 0.0075 g of di-n-butyltin dilaurate. After thorough mixing, the mixture was immersed in an oil bath at 80° C. The oil bath temperature was elevated to 106° C. The mixture was then evaporated to dryness under reduced pressure while this oil bath temperature was maintained. A dry polymer was obtained.

EXAMPLE 11

A dry polymer was obtained in the same way as in Example 1 except that gamma-(2-aminoethyl)aminopropyltrimethoxysilane was used as a silane coupling agent instead of gamma-glycidoxypropyltrimethoxysilane.

EXAMPLE 12

A dry polymer was obtained in the same way as in Example 1 except that gamma-chloropropyltrimethoxysilane was used as a silane coupling agent instead of gammaglycidoxypropyltrimethoxysilane.

The polymers obtained in Production Examples 1 to 6 and Examples 1 to 12 were each tested for pure water absorbability, salt water absorbability, the rate of water absorption, nonuniform water swelling and absorption, and water-absorbed gel strength by the following methods. The results are shown in Table 1.

A. Pure water absorbability

In a 1-liter beaker, about 0.5 g of the polymer and about 1 liter of pure water were mixed. The mixture was left to stand for about 60 minutes to swell the polymer fully with water. Water was then removed by filtration on a 100 mesh sieve, and the amount of water that passed through the sieve was weighed. The pure water absorbability was calculated in accordance with the following equation.

$$\text{Pure water absorbability (g/g resin)} = \frac{\text{Amount of water charged (g)} - \text{Amount of water passed (g)}}{\text{Amount of the polymer charged (g)}}$$

B. Salt water absorbability

In a 300 ml beaker, about 0.5 g of the polymer and about about 200 g of salt water having a salt concentration of 0.9% by weight were mixed. The mixture was left to stand for about 60 minutes to swell the polymer fully with salt water. Salt water was then removed by filtration on a 100 mesh sieve, and the amount of salt water that passed through the sieve was weighed. The salt water absorbability was calculated in accordance with the following equation.

$$\text{Salt water absorbability (g/g resin)} = \frac{\text{Amount of salt water charged (g)} - \text{Amount of salt water passed (g)}}{\text{Amount of the polymer charged (g)}}$$

C. Rate of water absorption (1)

About 200 g of salt water having a salt concentration of of was put in a 300 ml beaker, and about 0.5 g of the polymer was added and dispersed. The polymer was swollen by standing for a predetermined period of time (1, 3, or 5 minutes). After standing, the mixture was filtered on a 100-mesh sieve. The amount of the salt water that passed through the sieve was weighed, and the water absorbability was calculated for each period in accordance with the equation shown in B above.

D. Nonuniform water swelling and absorption

The polymer (0.5 g) was put in a Petri dish, and 20 cc of salt water was added dropwise by a pipette. The polymer was then observed visually for nonuniform water swelling and absorption.

E. Water-absorbed gel strength

To the polymer was added 200 times its own weight of pure water to cause water absorption. The strength of the water-absorbed gel was examined by pressing the gel with a finger to determine its elasticity. The strength was evaluated on the following rating.

X : weak
Δ: slightly weak
○ : ordinary
◉ : slightly strong
◎ : strong

TABLE 1

| Type of polymer | Pure water absorbability (g/g resin) | Salt water absorbability (g/g resin) | Rate of water absorption (g/g resin) | | | Nonuniform water swelling and absorption | Water-absorbed gel-strength |
| --- | --- | --- | --- | --- | --- | --- | --- |
| | | | 1 min. | 3 min. | 5 min. | | |
| Production Example | | | | | | | |
| 1 | 1831.0 | 167.0 | 26.5 | 44.8 | 49.7 | Yes | X |
| 2 | 450.0 | 62.0 | 10.2 | 15.3 | 20.5 | " | Δ |
| 3 | 983.4 | 92.6 | 18.7 | 27.2 | 30.8 | " | X-Δ |
| 4 | 350.5 | 58.0 | 15.0 | 18.0 | 19.5 | " | Δ-○ |
| 5 | 523.5 | 50.9 | 9.5 | 14.5 | 18.5 | Slight | ◉-◎ |
| 6 | 512.8 | 75.0 | 15.5 | 19.5 | 21.0 | Yes | X |
| Example | | | | | | | |
| 1 | 885.3 | 105.1 | 85.5 | 95.0 | 100.5 | No | ○ |
| 2 | 389.5 | 60.5 | 53.4 | 54.5 | 55.0 | " | ◉-◎ |
| 3 | 795.6 | 89.5 | 78.2 | 85.1 | 86.5 | " | ○-◎ |
| 4 | 335.2 | 55.3 | 30.5 | 34.5 | 36.0 | " | ◎ |
| 5 | 485.0 | 50.5 | 25.5 | 30.5 | 35.6 | " | ◎ |
| 6 | 440.8 | 68.0 | 56.0 | 57.5 | 59.0 | " | ◎ |
| 7 | 1050.5 | 102.5 | 90.5 | 92.5 | 93.0 | " | ○-◎ |
| 8 | 395.0 | 59.5 | 54.0 | 54.5 | 54.8 | " | ◎ |
| 9 | 852.1 | 95.3 | 78.5 | 82.5 | 83.5 | " | ○-◎ |
| 10 | 395.8 | 61.5 | 54.5 | 55.0 | 55.2 | " | ◎ |
| 11 | 1254.3 | 115.2 | 68.5 | 80.5 | 85.5 | " | ○ |
| 12 | 1051.3 | 108.3 | 65.3 | 75.4 | 80.5 | " | ○ |

POLYMER PRODUCTION EXAMPLE 7

A water-absorbing polymer was produced by the following procedure in accordance with Example 1 described in Japanese Patent Application No. 275,308/1984.

Cyclohexane (375 g) was put in a 1-liter four-necked round-bottomed flask equipped with a stirrer, a reflux condenser, a thermometer and a nitrogen gas introduction tube, and 4.5 g of sorbitan monostearate was added and dissolved. Nitrogen gas was blown into the flask to drive off the dissolved oxygen.

Separately, 75 g of acrylic acid was put in a 500 ml flask, and with external ice cooling, a solution of 31.2 g of sodium hydroxide in 201 g of water was added to neutralize 74.9% of the carboxyl group of acrylic acid. The concentration of the monomer in water corresponded to 30% by weight.

Thereafter, 0.050 g of N,N'-methylenebis-acrylamide and 0.26 g of potassium persulfate were added and dissolved, and nitrogen gas was blown into the flask to drive off the dissolved oxygen.

The contents of the 500 ml flask were added to the contents of the four-necked flask. The mixture was stirred to disperse it, and while nitrogen gas was bubbled through the flask, the inside temperature of the flask was elevated by an oil bath. After reaching 60° C., the inside temperature abruptly rose and reached 72° C. in several tens of minutes. Then, while the inside temperature was maintained at about 64, the mixture was reacted for 3 hours with stirring at 250 rpm.

After the 3-hour reaction, the stirring was stopped, whereupon the wet polymer particles settled to the bottom of the flask. The polymer particles could be easily separated from the cyclohexane layer by decantation. The separated wet polymer was transferred to a vacuum dryer, and heated to 80° to 90° C. to remove the adhering cyclohexane and water. A nonsticky powdery polymer containing easily pulverizable masses was obtained.

EXAMPLE 13

The dry polymer obtained in Production Example 7 was pulverized to a size smaller than 25 mesh, and 40 g of the pulverized polymer was taken into a 300 cc eggplant-shaped flask. Then, 39 g of cyclohexane was added to form a slurry. While the slurry was stirred, a solution of 0.085 g of gamma-glycidoxypropyltrimethoxysilane in 9 g (22.5% by weight based on the water-absorbing polymer) and a solution of 0.2 g of di-n-butyltin dilaurate in 10 g of cyclohexane were added, and the mixture ws stirred at room temperature for about 30 minutes.

The flask was then immersed in an oil bath at 80° C., and the temperature was raised to 105° C., and the flask was maintained at this temperature for about 1 hour. The reaction mixture was evaporated to dryness under reduced pressure to give a dry polymer.

EXAMPLE 14

Water (190 g) was removed from the polymerization reacion mixture obtained in Production Example 7 as an azeotrope with cyclohexane (namely, 25 g of water was left in the polymer; the amount of this water corresponded to 27% by weight of the water-absorbing polymer). To the residue were added 0.2 g of gamma-glyciodoxypropyltrimethoxysilane and 0.4 g of di-n-butylin dilaurate. After thorough mixing, the mixture was immersed in an oil bath at 80° C. The oil bath temperature was elevated to 105° C., and the mixture was evaporatred to dryness under reduced pressure while maintaining this oil bath temperature. A dry polymer was obtained.

The salt water absorbability and the rate of water absorption of each of the polymers obtained in Examples 13 and 14 are shown in Table 2. The salt water absorbability was measured in the same way as described hereinabove. The rate of water absorption was measured by the following method.

Rate of water absorption (2)

Fifty milliliters of salt water having a salt concentration of 0.9% by weight was put in a 100 ml beaker. A magnetic stirrer was rotated. The time which elapsed from the introduction of 2 g of the polymer into the beaker until the stirrer stopped rotating was measured, and defined as the rate of water absorption.

TABLE 2

| Example | Salt water absorbability (g/g resin) | Rate of water absorption (sec) |
|---|---|---|
| 13 | 79.8 | 22 |
| 14 | 72.2 | 25 |

As illustrated hereinabove, the process of this invention can easily give highly water-absorbing polymers which have high water absorbability and a fast rate of water absorption and can absorb water rapidly without nonuniform water swelling and absorption, and which in the water-absorbed state, have high strengths. By utilizing their excellent properties, these polymers can be advantageously used in the production of various sanitary materials including sanitary napkins and paper diapers, and various horticultural and agricultural materials inlcuding soil conditioners and water-holding materials.

What is claimed is:

1. A process for producing a highly water-absorbing polymer which comprises treating a water-absorbing polymer containing a carboxyl group and/or a carboxylate group with a silane coupling agent in the presence of 0.5 to 300% by weight, based upon the weight of the water-absorbing polymer, of water, said treatment being carried out at a temperature and time sufficient to swell the polymer, evaporate the water, and produce a highly water-absorbing polymer.

2. The process of claim 1 wherein the silane coupling agent is represented by the following formula $$X(R)_m Si(Y)_{3-m} \qquad (I)$$

wherein X represents a group having a functional group capable of reacting with the carboxyl group and/or the carboxylate group of the water-absorbing polymer, R represents a hydrocarbon group, Y represents a hydrolyzable group, and m is 0, 1 or 2.

3. The process of claim 1 wherein the water-absorbing polymer to be treated contains at least one type of units selected from the group consisting of units derived from acrylic acid, units derived from methacrylic acid, and units of acrylic or methacrylic acid in which the carboxyl group is in the form of a salt with an alkali metal.

4. The process of claim 1 wherein the treatment is carried out in the presence of 5 to 100% by weight, based on the water-absorbing polymer, of water.

5. The process of claim 1 wherein the treatment is carried out in the presence of a silanol condensation catalyst.

6. The process of claim 1 wherein the treatment is out in the presence of a silanol condensation catalyst and 10 to 50%, based on the water-absorbing polymer, of water.

7. The process of claim 1 wherein the temperature of treatment is in the range of 20° to 180° C.

* * * * *